United States Patent [19]

Naudin et al.

[11] Patent Number: 4,892,008
[45] Date of Patent: Jan. 9, 1990

[54] TORSION DAMPING DEVICE

[75] Inventors: Jacky Naudin, Ermont; Jacques Alas, Eaubonne, both of France

[73] Assignee: Valeo, Paris, France

[21] Appl. No.: 181,039

[22] Filed: Apr. 13, 1988

[30] Foreign Application Priority Data

Apr. 14, 1987 [FR] France ................................. 87 05294

[51] Int. Cl.⁴ ............................................. F16F 15/10
[52] U.S. Cl. ....................................... 74/574; 464/68; 192/70.17; 192/106.2
[58] Field of Search ............ 74/574; 192/106.1, 106.2, 192/70.17; 464/64, 66, 68

[56] References Cited

U.S. PATENT DOCUMENTS

| | | | |
|---|---|---|---|
| 1,943,517 | 1/1934 | Daukus | 74/574 |
| 2,209,403 | 7/1940 | Kittner et al. | 74/574 X |
| 3,101,600 | 8/1963 | Stromberg . | |
| 3,138,039 | 6/1964 | Zeidler et al. | 74/106.2 X |
| 4,093,054 | 6/1978 | Johns | 192/106.2 X |
| 4,468,207 | 8/1984 | Yoshida | 464/65 |
| 4,655,337 | 4/1987 | Carmillet et al. | 192/106.2 |
| 4,709,796 | 12/1987 | Uenohara | 192/106.1 |
| 4,767,380 | 8/1988 | Chasseguet et al. | 464/66 X |
| 4,789,374 | 12/1988 | Suzuki | 464/68 X |

FOREIGN PATENT DOCUMENTS

| | | | |
|---|---|---|---|
| 170950 | 2/1986 | European Pat. Off. | 74/574 |
| 0216476 | 4/1987 | European Pat. Off. . | |
| 2358516 | 2/1975 | Fed. Rep. of Germany | 74/574 |
| 2926012 | 10/1980 | Fed. Rep. of Germany . | |
| 1346144 | 11/1963 | France . | |
| 2568640 | 2/1986 | France . | |
| 2089472 | 6/1982 | United Kingdom . | |

Primary Examiner—Rodney M. Lindsey
Attorney, Agent, or Firm—Charles E. Brown; Charles A. Brown

[57] ABSTRACT

A torsion damping device comprises at least two coaxial parts mounted to move circumferentially relative to one another against the action of elastic units. Inside a coil spring of one elastic unit a stiffer elastic means is housed, comprising in the central zone of the said unit a block of relatively rigid plastic material and two elastic pads each disposed at one of the circumferential ends of the said unit with a predetermined clearance relative to the block.

4 Claims, 2 Drawing Sheets

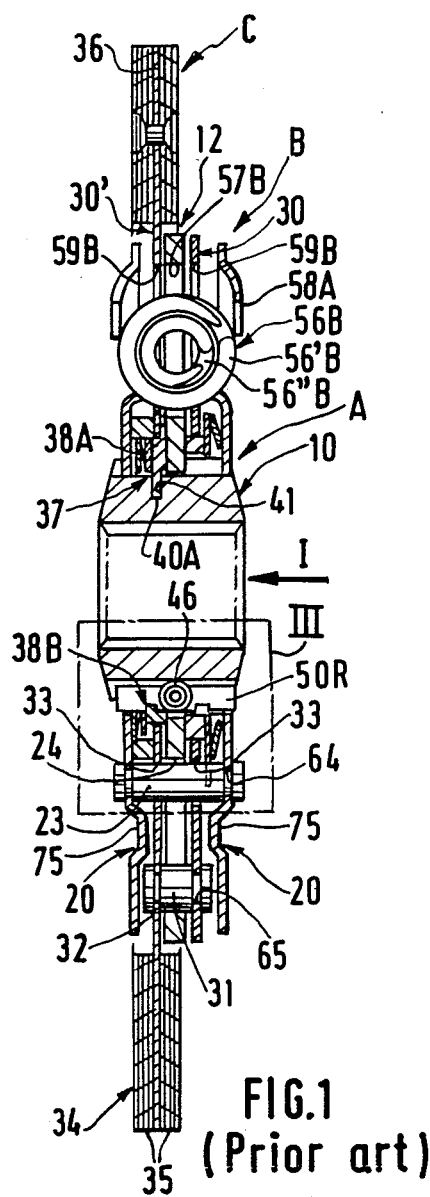
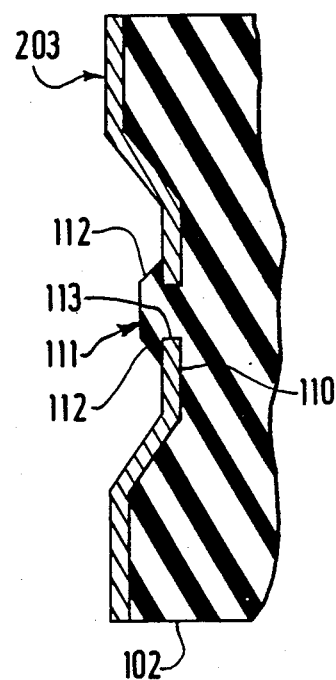
FIG.1 (Prior art)
FIG.3

TORSION DAMPING DEVICE

BACKGROUND OF THE INVENTION

1. Field of the Invention

The present invention relates in general to torsion damping devices comprising at least two coaxial parts mounted to rotate relative to one another within defined limits of angular displacement against elastic means adapted to act circumferentially between them over at least part of such angular displacement.

2. Description of the Related Art

Such a device has been described in French Patent Application No. 2568640 from which U.S. Pat. No. 4,655,337 claims priority.

In this document meshing means with clearance are provided between the hub flange 12 and the hub 10 as well as elastic means with low strength, whilst stiffer elastic units 56A, 56B are interposed between the flange 12 and the auxiliary flanges 20. The elastic units 56A, 56B each consist of two coaxial spring 56'A, 56"A and 56'B, 56"B (FIG. 1).

For certain applications it is required that the slope of the curve representing the intervention of the relatively stiff elastic units should be gentle, whilst transmitting a large torque at the end of the action.

In relation to the above mentioned requirement (FIG. 14) it can be seen that if it is desired to decrease the slope of curve II whilst transmitting the same torque at the end of the action, the angular movement between the parts to be damped must be further increased.

Taking into account the mechanical resistance of the parts, which depends particularly on the openings for housing the springs, it can be established that an impossible situation will be reached. That is all the more so because in this patent the angular movement is very large.

An attempt can be made to modify the damping device radically, but besides this not always being possible because of the space limitations which must be taken into account, this is done to the detriment of standardization of fabrication.

SUMMARY

The object of the present invention is to decrease these disadvantages and thus to further reduce the stiffness of the relatively stiff springs, whilst transmitting the same torque at the end of the action, by modifying the torsion damping device as little as possible and without decreasing the user's comfort.

According to the invention a torsion damping device of the kind mentioned above is characterized in that inside one elastic unit a stiffer elastic means is housed, comprising, in the central zone of the said unit, a block of relatively rigid plastic material and two elastic pads each disposed at one of the circumferential ends of the said unit with a predetermined clearance relative to the block.

In connection with the arrangements in document U.S. Pat. No. 4,655,337, for good balancing of the assembly, in two of the springs 56'B elastic means according to the present invention are housed.

By this measure a lower stiffness of the damping device is obtained before the intervention of the elastic means according to the present invention.

Thanks to the invention it is ensured that the block of relatively rigid plastic does not abrade the spring surrounding it, and noises are avoided.

The block may consist of polyamide 6/6 loaded with glass fibres.

Moreover, after the clearance between the block and the pads has been taken up, the final stiffness of the damping device is increased, which allows elastic transmission of a torque greater than the maximal engine torque, whilst retaining the maximum number of parts of the damper. Preferably the elastic pads are made of thermoplastic elastomer, such as polyester elastomer. Such a material has a long life, with a good temperature performance and above all a good dynamic damping factor allowing hysteresis phenomena to be well controlled.

Preferably the pads are supported on small spring seats, each interposed between a circumferential end of an elastic unit and one of the auxiliary flanges.

The pads may be moulded on the seats or be clipped on them. It is advantageous if the seats are identical for all the elastic units of relatively great stiffness. The seat may be shaped to make a space for housing, for example, a clipping lug projecting from the elastic pad.

Thus there is no risk of such a pad interfering with any of the flanges and/or plates of the torsion damping device.

Alternatively, the seat may be flat and the hub flange and the plates have openings to avoid any interference with the pad.

Of course, the dimensions of the shaped parts and/or openings are such that the conventional internal springs can bear on the said cup.

Alternatively the seat may be made in one piece with the elastic pads.

BRIEF DESCRIPTION OF THE DRAWINGS

FIG. 1 corresponds to FIG. 2 of U.S. Pat. No. 4,655,337.

FIG. 3 is a partial view in axial section of an alternative embodiment of the seat with its associated pad.

DESCRIPTION OF THE PREFERRED EMBODIMENTS

Figure 2:
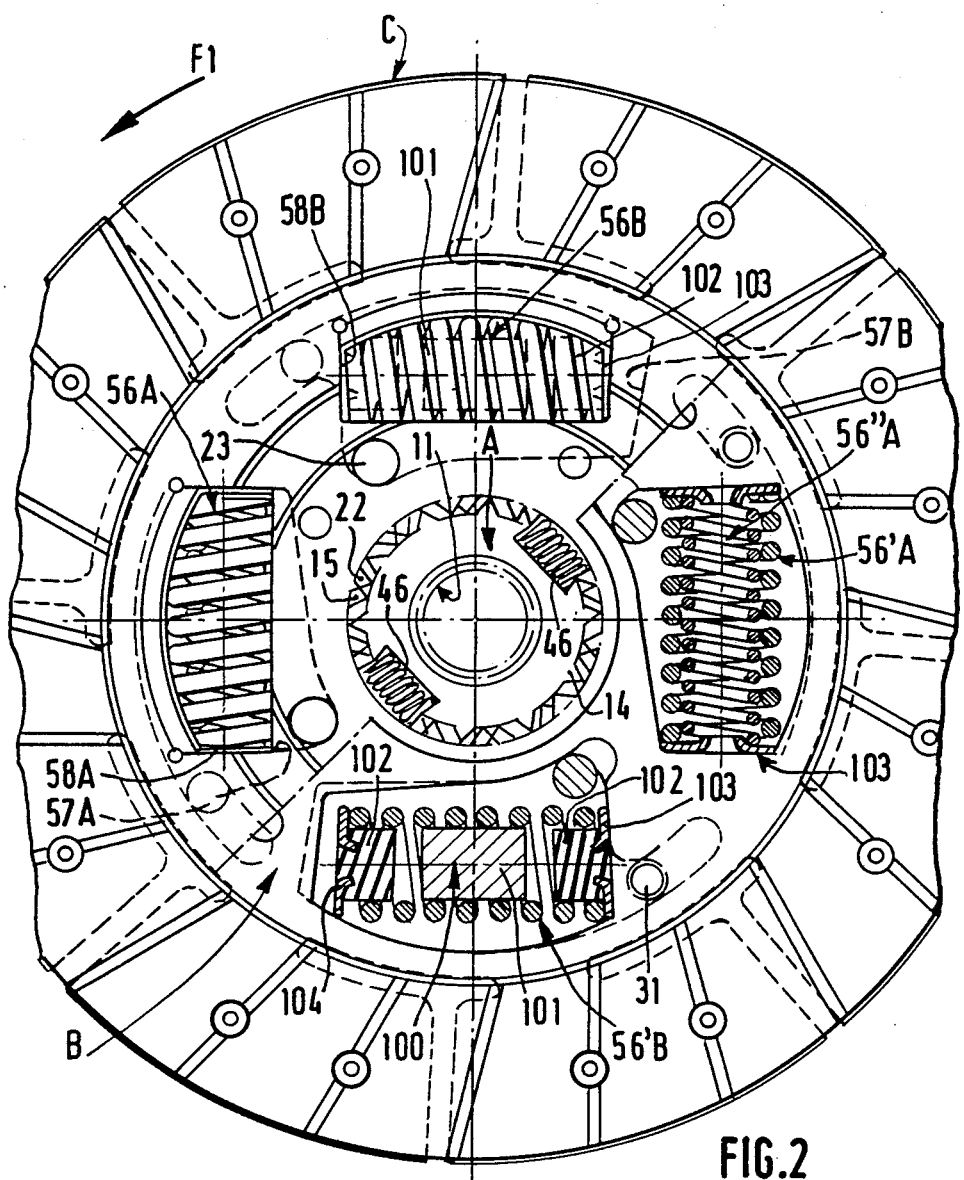
FIG. 2 is a partial view in elevation, with parts stripped away locally, of a torsion damping device according to the invention.

The figures illustrate by way of example the application of the invention to a friction clutch, especially for an automobile, of the kind described in the above mentioned patent U.S. Pat. No. 4,655,337. For simplicity the same reference numbers will be used as in the said patent.

As a remainder, this friction device comprises three coaxial parts A, B, C mounted two by two to rotate with respect to one another within a defined angular displacement and against elastic means with circumferential action, adapted to act circumferentially between them for at least part of such relative angular displacement.

Part A consists of a hub 10 intended to be bound in rotation with the entry shaft of the gearbox.

Part B comprises a flange 12, called the hub flange, which transversely forms an annular piece around hub 10 with, between it and the said hub 10, meshing means with clearance comprising two interacting sets of teeth 14, 15, one of them on the hub 10, and the other on the said hub flange 12.

The one set of teeth 14, 15 has a tooth engaged with a clearance in a circumferential throat of the other.

Part B also comprises two auxiliary flanges 20 situated on each side of the hub flange 12 and which are connected by bridging pieces 23 passing through the hub flange 12 by means of openings 24.

Interacting meshing means with clearance 22 are provided between the hub 12 and the auxiliary flanges 20 being in axial correspondence from one of the flanges 20 to the other.

The third part C comprises at least one flange 30, which differing from the flanges 12 and 20, is not connected to the hub 10, that is to say there are no meshing means with clearance between it and the latter.

Two flanges 30, 30' are provided on either side of flange 12, being disposed immediately neighbouring the latter, whilst the auxiliary flanges are disposed on either side of the flanges 30, 30' joined to one another by bridging pieces 31. Of course, the axial bridging pieces 23 pass through the flanges 30, 30' by means of the openings 33.

Part C also comprises a friction disc 34.

Between parts A and B are interposed elastic means with circumferential action. Here two diametrically opposite springs 46 are provided, each housed partly in a notch locally interupting the set of teeth 14 of hub 10, and partly in notches locally interrupting the set of teeth 15 of the hub flange 12 and that 22 of the auxiliary flanges 20.

Pins are inserted between the hub flange 12 and the auxiliary flanges 20. The elastic means interposed circumferentially between parts B and C comprise a plurality of elastic units 56A, 56B regularly distributed circularly and all being disposed substantially tangentially to a common circumference of the assembly.

In practice there are two elastic units 56A and alternating with these, two elastic units 56B.

The elastic units 56A each consist of two coaxial coiled springs, 56'A, 56"A whilst the elastic units 56B consist of an external coiled spring 56'B and an elastic means 100 described later.

These units are all housed, on the one hand, in an opening 57A, 57B of the hub flange 12 and the openings 58A, 58B of the auxiliary flanges 20, and, on the other hand, the openings 59A, 59B of the flanges 30, 30'. The openings here consist of windows.

The springs of units 56A, 56B are mounted without clearance in the openings 58A, 58B and the auxiliary flanges 20 constitute what it is usually convenient to call "guide washers". These spring have overall a stiffness greater than that of the springs 46, which is relatively low.

It will be noted that the windows 57A, 57B and 59A, 59B are shaped in connection with the alternating disposition of the meshing means with clearance 22 so that, for a first circumferential direction of the relative angular displacement between parts A and B, it is the hub flange which is first to intervene, whilst, for the opposite circumferential direction of the said angular displacement, on the contrary it is the auxiliary flanges which are first to intervene.

For the other arrangements, especially the means of friction, the bearing 37, patent U.S. Pat. No. 4,655,337 should be referred to.

According to the invention, inside at least one of the outer elastic units 56A, 56B with relatively high stiffness (relative to the springs 46) is housed an elastic means 100 with greater stiffness comprising, in the central zone of the said elastic unit 56A, 56B, a block of relatively rigid plastic material 101 disposed with a predetermined clearance relative to two elastic pads 102 which the said elastic unit presents at each of its ends.

As can be seen in FIG. 2 it is inside spring 56'B of elastic unit 56B that the elastic means 100 are housed according to the present embodiment. Here, in order to balance the radial forces, each of the coiled springs 56'B, diametrically opposite one another, has an associated elastic means 100.

It will be appreciated that the springs 56'B, as in the prior art, are identical to the springs 56'A, that the two springs 56"A are likewise identical to each other, and so are the elastic means 100. In practice the stiffness of the springs 56'A, 56"A, and 56'B is decreased.

In the embodiment example shown, the block 101 is made of polyamide 6/6 loaded with glass fibres, and the elastic pads 102 are made of thermoplastic elastomer such as polyester elastomer.

It will be noted that the elastic units 56A, at each of their circumferential ends, bear on the small seats 103, which are thus each interposed between the substantially radial edges of the windows 58A of the guide washers 20, 20' and the circumferential end of one of the units 56A. These small seats 103 with axial orientation, in the shape of small plates, join one of the radial edges of a window 58A of one of the auxiliary flanges 20 to the corresponding radial edge of the window of the other auxiliary flange 20.

In the embodiment, the openings 57A, 58A, 59A all having the same circumferential development, in the resting position of the assembly these small seats 103 are thus in alignment with the radial edges concerned of the hub flange 12 and the flanges 30, 30'.

The small seats 103 each have in the centre a funnel-shape 104 extending axially into the interior of the springs 56"A and forming a neck moulding with the main part of the small cup 103 with transverse orientation.

According to one characteristic of the invention the elastic pads 102 are supported with a slight clearance from the spring 56'B by means of the small seats 103.

More precisely, the same seats are used as are provided for the units 56A, and the elastic pads 102 are moulded onto these.

It will be appreciated that the funnel-shapes 104 are very suitable for such an operation.

Each of these small seats 103 supporting a pad 102 applies on the two radial edges concerned of the auxiliary flanges 20 and in the case of one of them on the corresponding radial edges of the flanges 30, 30', whilst the other is disposed at a distance from the edges concerned of the flanges 30, 30' and thus of the hub flange 12, the contours of the windows 57B of which can be seen shown by dotted lines.

The device operates in the following manner. In an action called "driving", shown by the arrow F1 in FIG. 2, corresponding to the normal direction of rotation, it is the guide washers 20 of part B which are the first to intervene.

The springs of elastic units 56A, 56B being stronger than the springs 46, in a first phase of operation the springs 46 are compressed until the auxiliary flanges 20 come to bear, by their set of teeth, in a positive manner on the set of teeth 14 of the hub 10.

Starting from this instant the elastic units 56A, 56B intervene in their turn, adding their effects to that of the springs 46 which remain compressed.

During this second phase, in a first period the springs 56′A, 56″A, 56′B all intervene simultaneously, then when the predetermined clearance between the block 101 and the pad 102 concerned has been used up, the stiffer elastic means 100 come into action, the pads 102 being compressed by bearing on the rigid block 101.

The elastic means 100 are in practice much stiffer than the springs 56′A, 56″A or 56′B and intervene to transmit a torque corresponding at least to the maximum torque from the engine.

By way of example, if it is desired to weaken to the optimum the stiffness of the damper before the intervention of the elastic means, the stiffness of the latter could be ten times greater.

During operation in "retro", in the course of the second phase of operation, because of the construction arrangements, in a first period only the elastic units 56A intervene, then in a second period the springs 56′B then finally the elastic means 100.

The alternative embodiment in FIG. 3 differs from that in FIG. 2 in the shape of the small seat 203. Instead of presenting a central funnel-shape this is provided with a pressed in portion 110 penetrating into the interior of the spring 56″A. The same small seat 203 is used for the elastic pad 102. This pad 102 has a lug 111 with an end in the shape of a harpoon 112. The pressed portion 110 is provided centrally with an opening 113 in such a way that, after penetration of the opening 113 by the lug 111, an assemblage is obtained with the pad 102 clipped to the small seat 203; the hooks of the harpoon 112, after manipulation to pass through the opening 113, coming to apply against the face of the pressed in portion 110 facing away from the spring 56′B.

Of course the depth of the pressed in portion 110 is greater than the projecting part of the lug 111.

Instead of a small cup with a pressed in portion 110, a flat small seat 203 provided centrally with an opening with a size less than that of the spring 56″A may be used, so that the latter can bear on the standardized small seat, and clearances may be provided in the small flanges 30, 30′ and the hub flange in order to make the space necessary for the lugs 111.

In practice, taking into account the dimensions of the lugs, only one clearance needs to be made in the hub 12.

Instead of assembly by clipping, of course, the pad 102 may be moulded on its small cup.

Thus as will be evident from the description, the differentiated intervention of the elastic means which replace the springs 56″B of U.S. Pat. No. 4,655,337 in itself permits, while retaining the same springs 56′A, 56′B, a gentler slope to be obtained.

Of course, as mentioned above, the stiffness of the springs 56′A, 56″A and 56′B is decreased to minimize even more the "thrashing" noises.

The circumferential clearance between the block 101 and the pads 102 is set so that the elastic means intervene at the end.

To give some idea, with an angular displacement of 20 degrees, as mentioned in patent U.S. Pat. No. 4,655,337, the elastic means intervene only in the last degrees of displacement and are thus very stiff to be able elastically to transmit at least the maximum engine torque. The intervention can take place, for example, in the last three degrees and for an engine torque of 15 A at 17M. DAN the maximal transmittable torque will be of the order of 20M. DAN.

It will be appreciated that the blocks 101 are relatively light, ligher than a metallic block, and consequently their effect on the springs 56′B due to centrifugal forces is less.

Moreover, being mounted with a slight clearance with respect to the springs 56′B they are less abrasive on the said springs. It will be appreciated that the use of pads made of polyester elastomer permits, relative to a block of natural rubber, better control of hysteresis.

Of course the present invention is not limited to the embodiments described and in particular, the torsion damping device may be of the conventional kind and comprise a hub flange integral with the hub and two guide washers which are free in relation to the hub, that is to say without meshing means with clearance engaging with it. In this case it is the guide washers which bear the disc carrying the fittings.

Similarly, the guide washers may be integral with the hub and the hub flange free in relation to the hub. In this case it is the hub flange which bears the disc carrying the fittings.

What is claimed is:

1. A torsion damping device, especially for automobiles, of the kind comprising at least two coaxial parts mounted to rotate relative to one another within defined limits of angular displacement against elastic units extending in the circumferential direction, each elastic unit having an interior, each elastic unit being disposed partly, on the one hand, in an opening of one of said parts and, on the other hand, in an opening of the other of said parts, wherein inside at least one elastic unit a stiffer elastic means is housed, comprising, in the central zone of said unit, a block of relatively rigid plastic material disposed with a predetermined clearance relative to two elastic pads which said elastic unit presents at each of its circumferential ends and wherein the elastic pads are supported by small spring seats in the shape of small plates interposed between each circumferential end of said elastic unit and a housing of one of the said parts.

2. A torsion damping device according to claim 1, wherein said small spring seat has a funnel shape extending axially into the interior of said elastic unit and forms a neck moulding with a main part of said small spring seat and wherein the elastic pads are moulded onto said small spring seat.

3. A torsion damping device according to claim 1, wherein the small spring seat is provided with a pressed-in portion penetrating into the interior of said elastic unit and wherein said pressed-in portion has a central opening and the elastic pad has a lug with an end in the shape of a harpoon for assembly by clipping the pad onto said small spring seat.

4. A torsion damping device according to claim 1, wherein one of the parts comprises a hub flange, the small spring seat is flat and has a central opening and the elastic pad has a lug with an end in the shape of a harpoon for assembly by clipping the pad onto said small spring seat and wherein the hub flange has a clearance for passage of the lug.

* * * * *